United States Patent [19]

Ellgen

[11] Patent Number: 5,789,112
[45] Date of Patent: Aug. 4, 1998

[54] LITHIUM MANGANESE OXIDE COMPOUND AND METHOD OF PREPARATION

[75] Inventor: Paul C. Ellgen, Oklahoma City, Okla.

[73] Assignee: Kerr-McGee Chemical Corporation, Oklahoma City, Okla.

[21] Appl. No.: 794,285

[22] Filed: Feb. 3, 1997

Related U.S. Application Data

[62] Division of Ser. No. 568,221, Dec. 6, 1995, Pat. No. 5,639,438.

[51] Int. Cl.$^6$ .................................................. H01M 4/50
[52] U.S. Cl. .................................. 429/223; 429/224
[58] Field of Search .............................. 429/224, 223; 423/599, 594, 595, 596, 598

[56] References Cited

U.S. PATENT DOCUMENTS 5,648,057  7/1997  Ueda et al. .......................... 423/599

OTHER PUBLICATIONS

WO 94/22767 published Oct., 1994.

Primary Examiner—Wayne Langel
Attorney, Agent, or Firm—Herbert M. Hanegan; J. Rodgers Lunsford, III; Charles L. Warner, II

[57] ABSTRACT

A method for manufacturing $Li_2M_bMn_{2-b}O_4$ which comprises the steps of providing $LiM_bMn_{2-b}O_4$; providing a lithium salt; forming a mixture of the $LiM_bMn_{2-b}O_4$ and lithium salt in a liquid medium; adding a reducing agent to the mixture; heating for sufficient time to effect substantially complete conversion; and separating the product $Li_2M_bMn_{2-b}O_4$.

10 Claims, No Drawings

1

LITHIUM MANGANESE OXIDE COMPOUND AND METHOD OF PREPARATION

This is a division of application Ser. No. 08/568,221, filed Dec. 6, 1995 U.S. Pat. No. 5,639,438.

FIELD OF THE INVENTION

The present invention relates to lithiated multicomponent manganese oxide compounds ($Li_2M_bMN_{2-b}O_4$) and their production by contacting $LiM_bMn_{2-b}O_4$ and a lithium salt in a solution or suspended in a liquid medium with a reducing agent other than lithium metal.

BACKGROUND OF THE INVENTION

The present invention relates to lithiated multicomponent manganese oxides, to methods of making such materials and to the use of such materials in the manufacture of the cathodes of electrochemical cells.

More particularly it relates to a process for the manufacture of $Li_2M_bMn_{2-b}O_4$ and the use $Li_2M_bMn_{2-b}O_4$ in electrical storage batteries. Still more particularly, it relates to a process for the manufacture of $Li_2M_bMn_{2-b}O_4$ by the reaction of $LiM_bMn_{2-b}O_4$ with lithium salts and reducing agents other than lithium metal and to using $Li_2M_bMn_{2-b}O_4$ in the manufacturing of the cathode component of rechargeable lithium-ion electrical storage batteries.

Conventionally used nonaqueous electrolyte cells are primary cells which can be used only once. With recent widespread use of video cameras and small audio instruments, there has been an increased need for secondary cells which can be used conveniently and economically over many charge-discharge cycles.

Lithium cells useful as electrical storage batteries incorporate a metallic lithium anode and a cathode including an active material which can take up lithium ions. An electrolyte incorporating lithium ions is disposed in contact with the anode and the cathode. During discharge of the cell, lithium ions leave the anode, enter the electrolyte and are taken up in the active material of the cathode, resulting in release of electrical energy. Provided that the reaction between the lithium ions and the cathode-active material is reversible, the process can be reversed by applying electrical energy to the cell. If such a reversible cathode-active material is provided in a cell having the appropriate physical configuration and an appropriate electrolyte, the cell can be recharged and reused. Rechargeable cells are commonly referred to in the battery art as secondary cells.

It has long been known that useful cells can be made with a lithium metal anode and a cathode material which is a sulfide or oxide of a transition metal, i.e., a metal capable of assuming plural different valence states. Dampier, "The Cathodic Behavior of CuS, $MoO_3$ and $MnO_2$ in Lithium Cells," J. Electrochem. Soc., Vol. 121, No. 5, pp. 656–660 (1974) teaches that a cell incorporating a lithium anode and manganese dioxide cathode-active material can be used as an electrical power source. The same reference further teaches that a lithium and manganese dioxide cell can serve as a secondary battery.

There has been considerable effort in the battery field directed towards development of cathode materials based on lithium manganese oxides. Both lithium and manganese dioxide are relatively inexpensive, readily obtainable materials, offering the promise of useful, potent battery at low cost. Nonaqueous electrolyte primary cells using lithium as a negative electrode-active material and nonaqueous solvent such as an organic solvent as an electrolyte have advantages in that self-discharge is low, nominal potential is high and storability is excellent. Typical examples of such nonaqueous electrolyte cells include lithium manganese dioxide primary cells which are widely used as current sources for clocks and memory backup of electronic instruments because of their long-term reliability.

Secondary lithium batteries using an intercalation compound as cathode and free lithium metal as anode have been studied intensively due to their potential technological significance. Unfortunately, these studies have revealed that inherent dangers associated with the use of free lithium discourage the use of such batteries in general consumer applications. Upon repeated cycling, dendritic growth of lithium occurs at the lithium electrode. Growth of lithium dendrites can lead eventually to an internal short-circuit in the cell with a subsequent hazardous uncontrolled release of the cell's stored energy.

One approach to improving the reversibility of lithium-based anodes involves the use of lithium intercalation compounds. The intercalation compound serves as a host structure for lithium ions which are either stored or released depending on the polarity of an externally applied potential. During discharge the electromotive force reverses the forced intercalation thereby producing current.

Batteries using this approach, in which an intercalation compound is used as the anode instead of free lithium metal, are known in the art as "lithium-ion" or "rocking-chair" batteries. Utilization of $Li_2Mn_2O_4$ in lithium-ion secondary batteries is described in detail in the recent review paper, "The $Li_{1+x}Mn_2O_4$/C Rocking-chair System," J. M. Tarascon and D. Guyomard, Electrochimica Acta, Vol. 38, No. 9, pp. 1221–1231 (1993).

In this approach, a nonaqueous secondary cell is provided with (a) a negative electrode consisting essentially of a carbonaceous material as a carrier for a negative electrode active material, said carrier being capable of being doped and dedoped with lithium and (b) a positive electrode comprising lithium manganese complex oxide as an essential positive electrode-active material. This cell has a high expected applicability because dendrite precipitation of lithium does not occur on the surface of the negative electrode, the pulverization of lithium is inhibited, the discharge characteristics are good and the energy density is high.

The output voltage of this lithium-ion battery is defined by the difference in chemical potential of the two insertion compounds. Accordingly, the cathode and anode must comprise intercalation compounds that can intercalate lithium at high and low voltages, respectively.

The viability of this concept has been demonstrated and future commercialization of such cells in D, AA or coin-type batteries has been indicated. These cells include a $LiMn_2O_4$, a $LiCoO_2$, or a $LiNiO_2$ cathode, an electrolyte and a carbon anode. These lithium-ion batteries are thought to be superior to nickel-cadmium cells, and they do not require a controlled environment for fabrication because the lithium based cathode is stable in an ambient atmosphere, and the anode is not free metal, but an intercalation compound used in its discharged state (without intercalated lithium), that is also stable in an ambient atmosphere.

However, a nonaqueous electrolyte secondary cell such as described above has disadvantages in that some cell capacity is lost because some of the lithium doped into the carbonaceous material used as a negative electrode active material cannot be dedoped upon discharge. In practice, either carbon or graphite irreversibly consumes a portion of the lithium during the first charge-discharge cycle. As a result the capacity of the electrochemical cell is decreased in proportion to the lithium that is irreversibly intercalated into the carbon during the first charge.

This disadvantage can be eliminated by using $Li_2Mn_2O_4$ as all or part of the cathode. Upon the first charge of the cell so manufactured, the $Li_2Mn_2O_4$ is converted to $\lambda\text{-}Mn_2O_4$. When the cell is operated over the appropriate range of electrical potential, subsequent discharge cycles of the cell convert $\lambda\text{-}Mn_2O_4$ to $LiMn_2O_4$, and charge cycles convert $LiMn_2O_4$ to $\lambda\text{-}Mn_2O_4$. Because excess lithium is available to satisfy the irreversible consumption by carbon or graphite, cells manufactured using $Li_2Mn_2O_4$ have greater electrical capacity.

The capacity of a lithium ion cell is also limited by the quantity of lithium which can be reversibly removed (i.e., cycled) from the cathode. In the cathode materials of the prior art, only about one half mole of lithium per transition metal can be removed reversibly. Thus, they have limited specific capacity, generally no more than about 140 mAh/g.

In principle, one mole of lithium per mole of manganese can be removed reversibly from $Li_2Mn_2O_4$. In practice, however, cells that cycle between $Li_2Mn_2O_4$ and $LiMn_2O_4$ suffer more rapid loss of electrical capacity than cells that cycle between $LiMn_2O_4$ and $\lambda\text{-}Mn_2O_4$. Moreover, cells that cycle between $LiMn_2O_4$ and $\lambda\text{-}Mn_2O_4$ deliver most of their electrical energy between about 4 volts and about 3 volts, whereas, cells that cycle between $Li_2Mn_2O_4$ and $LiMn_2O_4$ deliver most of their electrical energy between about 3 volts and about 2 volts.

Thus, a combination of factors gives a lithium-ion cell that cycles lithium between a carbon or graphite matrix as the anode and $LiMn_2O_4$ as the fully discharged cathode many particularly attractive features. Such cells can be assembled conveniently in an over-discharged state using carbon or graphite for the anode and $Li_2Mn_2O_4$ for the cathode. Because the second lithium ion cannot be used effectively for repeated cycling, its consumption to satisfy the irreversible lithium intercalation of the carbonaceous anode material does not entail any additional loss of electrical capacity.

The compounds $LiMn_2O_4$ and $Li_2Mn_2O_4$ that are useful in this application are known in the art. Depending upon methods of preparation, their stoichiometries can differ slightly from the ideal. They are precisely identified however by their x-ray powder diffraction patterns. The materials herein referred to as $LiMn_2O_4$ and $Li_2Mn_2O_4$ have the diffraction spectra given on cards 35-781 and 38-299, respectively, of the Powder Diffraction File published by the International Centre for Diffraction Data, Newtown Square Corporate Campus, 12 Campus Boulevard, Downtown Square, Pa., 19073-3273, USA. The materials designated $LiM_bMn_{2-b}O_4$ and $Li_2M_bMn_{2-b}O_4$, in which M represents a metal other than manganese, which are the subjects of this invention, are essentially isostructural with $LiMn_2O_4$ and $Li_2Mn_2O_4$ respectively, and have powder diffraction spectra which differ from those of $LiMn_2O_4$ and $Li_2Mn_2O_4$ only by small displacements of corresponding diffraction peaks and small differences in their relative intensities.

$LiMn_2O_4$ can be prepared from a wide range of lithium sources and a wide range of manganese sources under a wide range of conditions. U.S. Pat. No. 5,135,732 discloses a method for the low temperature preparation of $LiMn_2O_4$. The materials $LiM_bMn_{2-b}O_4$ can be prepared under a wide range of conditions by replacing an amount of the manganese source corresponding to b moles of manganese per mole of lithium, with an amount of a source of the alternative metal, M, corresponding to b moles of alternative metal per mole of lithium. Y. Bito, et al., Proc.-Electrochem. Soc. 1993, 93-23, 461-472. Y. Toyoguchi, U.S. Pat. No. 5,084,366, Jan. 28, 1992. The range of conditions over which $LiM_bMn_{2-b}O_4$ can be synthesized varies with the metal M and with b, the proportion of M in the compound. In general, the synthesis is more facile as the value of b is smaller. The compound $LiM_bMn_{2-b}O_4$ is a raw material for the present invention.

In contrast, $Li_2Mn_2O_4$ is more difficult to prepare and, in fact, known methods for the preparation of $Li_2Mn_2O_4$ are excessively costly. Preparation of the substituted compounds $Li_2M_bMn_{2-b}O_4$ and their use in rechargeable batteries are the subjects of this invention. In the manufacture of cathodes for rechargeable lithium-ion batteries, this material has the advantages that accrue from the use of $Li_2Mn_2O_4$ as described above. Additionally, the $Li_2M_bMn_{2-b}O_4$ materials produce cathodes which have either greater electrical storage capacity or superior cyclability or both compared to similarly prepared cathodes based on $Li_2Mn_2O_4$.

SUMMARY OF THE INVENTION

It is an object of the present invention to provide a nonaqueous electrolyte secondary cell having an increased cell capacity which comprises a negative electrode consisting essentially of a carrier for a negative electrode active material and a positive electrode comprising a substituted lithium manganese oxide as an essential positive electrode active material.

In accordance with the present invention, the above object can be accomplished by a lithiated multicomponent metal oxide of the formula $Li_2M_bMn_{2-b}O_4$ prepared by contacting $LiM_bMn_{2-b}O_4$ and a lithium salt in solution or suspended in a liquid medium with a reducing agent other than lithium metal.

DESCRIPTION OF THE PREFERRED EMBODIMENT

As noted above, this invention is directed to a method of manufacturing a lithiated multicomponent metal oxide, $Li_2M_bMn_{2-b}O_4$. Specifically such method is accomplished by providing $LiM_bMn_{2-b}O_4$, providing a lithium salt, forming a mixture of the $LiM_bMn_{2-b}O_4$ and the lithium salt in a solution or suspended in a liquid medium, and adding a reducing agent other than lithium metal.

Advantageously the reaction of the present invention between the reducing agent, the $LiM_bMn_{2-b}O_4$, and the lithium salt is carried out at a temperature of less than about 100° C. at ambient pressure. Preferably the reaction is carried out at a temperature of from about 20° C. to about 80° C. at a pressure of less than about 45 psi.

Advantageously the lithium salt of the present invention is selected from the group consisting of LiOH and $Li_2CO_3$. The preferred lithium salt is LiOH. The method of this invention may also be practiced wherein the lithium salt is an aqueous form prior to the suspension with $LiM_bMn_{2-b}O_4$ being formed.

Advantageously the reducing agent of the present invention is selected from the group consisting of hydrazine, hydrazine sulfate, hydroxylamine hydrochloride, lithium borohydride and lithium, ammonium and hydrogen sulfides. The most preferred reducing agent is hydrazine. The method of the present invention can also be practiced wherein the reducing agent is in an aqueous form prior to adding to the $LiM_bMn_{2-b}O_4$ - lithium salt mixture.

The liquid medium of the present invention advantageously is selected from the group consisting of water and alkyl alcohols. The liquid medium most preferred is water.

The reaction between the reducing agent, the $LiM_bMn_{2-b}O_4$ and the lithium salt is advantageously carried out under basic conditions. If the liquid medium is essentially aqueous, the pH is advantageously greater than about 7. Preferably the reaction takes less than about 240 minutes to complete. Most preferably the reaction takes from about 5 minutes to about 60 minutes to complete.

As discussed above, the use for which the $Li_2M_bMn_{2-b}O_4$ prepared by the method of this invention is uniquely applicable is in the manufacture of a cathode for use in a secondary lithium ion electrochemical cell. Such a cell may be of known design having a lithium intercalation anode, a suitable nonaqueous electrolyte, a cathode of material made by the method of this invention, and a separator between the anode and the cathode. The anode may be of known materials such as transition metal oxides, transition metal sulfides and carbonaceous materials. The nonaqueous electrolyte can be in the form of a liquid, a gel or a solid matrix that contains mobile lithium ions.

The lithiated multicomponent metal oxide is represented by the formula $Li_2M_bMn_{2-b}O_4$ wherein M is a metal other than manganese, and advantageously b is from about 0.001 to about 1.999. Preferably b is from about 0.001 to about 0.20. Advantageously the metal M is selected from the group consisting of Al, Ti, V, Cr, Fe, Co, Ni, and Cu.

Advantageously when the metal is Al b is about 0.2 or less.

Advantageously when the metal is Ti b is about 0.2 or less.

Advantageously when the metal is Cr b is about 0.2 or less.

Advantageously when the metal is Fe b is about 0.5 or less.

Advantageously when the metal is Co b is about 0.2 or less.

Advantageously when the metal is Ni b is about 0.2 or less.

Advantageously when the metal is Ni b is about 0.5 or less

Advantageously when the metal is Ni b is from about 0.5 to about 1.99.

Advantageously when the metal is Ni b is about 1.10.

Advantageously when the metal is Cu b is about 0.2 or less.

Advantageously when the metal is V b is 0.2 or less.

As discussed above, the use for which the lithiated multicomponent metal oxide prepared by the method of this invention is uniquely applicable is in the manufacture of a cathode for use in a secondary lithium ion electrochemical cell. Such a cell may be of known design having a lithium intercalation anode, a suitable nonaqueous electrolyte, a cathode of material made by the method of this invention, and a separator between the anode and the cathode. The anode may be of known materials such as transition metal oxides, transition metal sulfides and carbonaceous materials. Advantageously the nonaqueous electrolyte is in liquid form.

EXAMPLE

This Example shows the syntheses of $Li_2M_{0.2}Mn_{1.8}O_4$ where M is Ti, V, Cr, Fe, Co, Ni, and Cu. In these experiments, $LiM_{0.2}Mn_{1.8}O_4$ compounds were reacted with aqueous hydrazine in the presence of one equivalent of $LiOH \cdot H_2O$.

Where M is Fe, Ni, and Cu, the reaction was carried out in a 250 ml three-neck round-bottom flask fitted with an overhead stirrer, a thermometer, a reflux condenser, and an argon inlet. Where M is Ti, V, Cr, and Co, the reaction was carried out in a Schlenk tube, under an argon atmosphere, and stirring effected with a magnetically driven bar. $Li_2M_{0.2}Mn_{1.8}O_4$ (20.00 g, about 110 mmoles), $LiOH \cdot H_2O$ (one equivalent, about 4.62 g), and deionized water were charged to the reaction vessel. Stirring was begun, and a graduated syringe used to add $N_2H_4 \cdot H_2O$ (one equivalent, about 1.38 g) to the suspension. (For $LiCr_{0.2}Mn_{1.8}O_4$, reactant quantities were 25% greater.) In some cases, heat was applied. (See Table.) Where the reaction vessel was a round-bottom flask, heat was applied with an electric mantle; where it was a Schlenk tube, heat was applied with an oil bath. Gas was evolved. The color of the suspension changed from black to brown. When gas evolution ceased, the product was recovered by filtration in a Schlenk filter tube under an atmosphere of argon. Residual water was removed in an oil-pump vacuum, with heat applied to the sample either from several turns of electric-heat tape or from a sun lamp. The dry product was transferred to a glass jar in an inert atmosphere box.

Products were analyzed by X-ray powder diffraction. The materials $Li_2M_bMn_{2-b}O_4$ tend to react with oxygen and water from the air. To avoid decomposition during X-ray analysis, the sample plaques were prepared in an inert-atmosphere box, and a hydrocarbon oil (3-in-1 Household Oil™) was mixed with the sample before the plaque was pressed. This procedure afforded excellent protection.

The formation of products $Li_2M_bMn_{2-b}O_4$ was inferred from the presence of X-ray diffraction peaks closely approximating those of the known compound $Li_2Mn_2O_4$, as described on card 38-299 of the Powder Diffraction File described above. The results are reported in the Table.

TABLE $Li_2M_{0.2}Mn_{1.8}O_4$ Preparation Experiments

| M | $LiM_{0.2}Mn_{1.8}O_4$ | T, °C. | Time, Hour | Vol $H_2O$ ml | Principal Product |
|---|---|---|---|---|---|
| Ti | $LiTi_{0.2}Mn_{1.8}O_4$ | 25 | 0.3 | 50 | Primarily $Li_2Ti_{0.2}Mn_{1.8}O_4$ |
| V | $LiV_{0.2}Mn_{1.8}O_4$ | 85 | 3 | 50 | Primarily $Li_2V_{0.2}Mn_{1.8}O_4$ |
| Cr | $LiCr_{0.2}Mn_{1.8}O_4$ | 25 | 0.3 | 50 | Primarily $Li_2Cr_{0.2}Mn_{1.8}O_4$ |
| Fe | $LiFe_{0.2}Mn_{1.8}O_4$ | 25 | 5 | 200 | Partial conversion to $Li_2Fe_{0.2}Mn_{1.8}O_4$ |
| Co | $LiCo_{0.2}Mn_{1.8}O_4$ | 25 | 20 | 50 | Partial conversion to $Li_2Co_{0.2}Mn_{1.8}O_4$ |
| Ni | $LiNi_{0.2}Mn_{1.8}O_4$ | 60 | 22 | 150 | Partial conversion to $Li_2Ni_{0.2}Mn_{1.8}O_4$ |
| Cu | $LiCu_{0.2}Mn_{1.8}O_4$ | 80 | 3 | 100 | Low conversion; many by-products |

What is claimed is:

1. A cathode for use in a secondary lithium ion electrochemical cell which is produced using $Li_2M_bMn_{2-b}O_4$ manufactured by the method of
   a. Providing $LiM_bMn_{2-b}O_4$;
   b. Providing a lithium salt,
   c. Contacting the $LiM_bMn_{2-b}O_4$ and the lithium salt in a liquid medium to form a mixture;

d. Adding a reducing agent to the mixture formed in step (c); and e. Heating the reducing agent and mixture at a temperature and for a time sufficient to form a $Li_2M_bMn_{2-b}O_4$ compound;

wherein M is a metal other than manganese and b is from about 0.001 to about 1.999.

2. A secondary lithium ion electrochemical cell comprising a lithium intercalation anode, a nonaqueous electrolyte, a cathode as defined in claim 1, and a separator between the anode and the cathode.

3. An electrochemical cell according to claim 2 wherein the anode comprises a material selected from the group consisting of transition metal oxides, transition metal sulfides and carbonaceous material.

4. An electrochemical cell according to claim 3 wherein the electrolyte is in liquid form.

5. The cathode of claim 1 wherein M is selected from the group consisting of Al, Ti, V, Cr, Fe, Co, Ni, and Cu.

6. A secondary lithium ion electrochemical cell comprising a lithium intercalation anode, a nonaqueous electrolyte, a cathode as defined in claim 5 and a separator between the anode and the cathode.

7. An electrochemical cell according to claim 6 wherein the anode comprises a material selected from the group consisting of transition metal oxides, transition metal sulfides and carbonaceous material, and wherein the electrolyte is in liquid form.

8. A cathode for use in a secondary lithium ion electrochemical cell comprising as the active material a lithiated multicomponent metal oxide produced by the method of:

a. Providing $LiM_bMn_{2-b}O_4$;

b. Providing a lithium salt:

c. Contacting the $LiM_bMn_{2-b}O_4$ and the lithium salt in a liquid medium to form a mixture:

d. Adding a reducing agent to the mixture: and e. Heating the reducing agent and mixture at a temperature and for a time sufficient to form a $Li_2M_bMn_{2-b}O_4$ compound wherein M is a metal other than manganese and b is from about 0.001 to about 1.999.

9. A secondary lithium ion electrochemical cell comprising a lithium intercalation anode, a nonaqueous electrolyte, a cathode as defined in claim 8 and a separator between the anode and the cathode.

10. An electrochemical cell according to claim 9 wherein the anode comprises a material selected from the group consisting of transition metal oxides, transition metal sulfides and carbonaceous material, and wherein the electrolyte is in liquid form.

* * * * *